(12) United States Patent
Keith

(10) Patent No.: US 6,485,363 B2
(45) Date of Patent: Nov. 26, 2002

(54) SHRIMP PROCESSING MACHINE AND METHOD OF PROCESSING SHRIMP

(75) Inventor: Jon T. Keith, Wheeling, IL (US)

(73) Assignee: Gregor Jonsson, Inc., Highland Park, IL (US)

( * ) Notice: Subject to any disclaimer, the term of this patent is extended or adjusted under 35 U.S.C. 154(b) by 0 days.

(21) Appl. No.: 09/818,167

(22) Filed: Mar. 27, 2001

(65) Prior Publication Data

US 2002/0142714 A1 Oct. 3, 2002

(51) Int. Cl.[7] .............................................. A22C 29/02
(52) U.S. Cl. ................................................ 452/3; 452/5
(58) Field of Search ..................... 452/2, 3, 5

(56) References Cited

U.S. PATENT DOCUMENTS

| | | | |
|---|---|---|---|
| 3,159,871 A | 12/1964 | Jonsson | |
| 3,751,766 A | 8/1973 | Jonsson | |
| 4,413,377 A | 11/1983 | Betts | |
| 4,414,709 A | 11/1983 | Betts | |
| 4,439,893 A | 4/1984 | Betts | |
| 4,472,858 A | 9/1984 | Keith | |
| 4,473,740 A | 9/1984 | Ellis | |
| 4,507,825 A | 4/1985 | Betts et al. | |
| 4,745,660 A | 5/1988 | Betts et al. | |
| 4,769,871 A | 9/1988 | Betts | |
| 5,035,669 A | 7/1991 | Betts | |
| 5,035,670 A | 7/1991 | Pershinske | |
| 5,366,405 A | 11/1994 | Keith et al. | |
| 5,435,775 A | 7/1995 | Jonas | |
| 5,522,764 A | 6/1996 | Keith et al. | |

*Primary Examiner*—Charles T. Jordan
*Assistant Examiner*—Joan Olszewski
(74) *Attorney, Agent, or Firm*—Marshall, Gerstein & Borun

(57) ABSTRACT

A shrimp processing machine and method of processing shrimp are described. A reciprocating meat picking assembly powered by a main drive wheel of the machine rotates a cam wheel to cause a cam arm of the meat picking assembly to reciprocate relative to the drive wheel. Meat picking tines mounted to the cam arm reciprocate with respect to the drive wheel to retrieve a shrimp from the drive wheel upon each rotation of the cam wheel. A deveining brush having a substantially v-shaped cross sectional profile removes a vein from a processed shrimp. The cutting assembly of the machine is provided with a leaf spring which is aligned with the cutter arm of the assembly to ensure that the cutter arm is biased toward the drive wheel, but is done so in a manner which avoids off-axis loading of the cutter arm.

23 Claims, 7 Drawing Sheets

SHRIMP PROCESSING MACHINE AND METHOD OF PROCESSING SHRIMP

FIELD OF THE INVENTION

The invention generally relates to food processing equipment and, more particularly, relates to equipment and methods for shelling and deveining shrimp.

BACKGROUND OF THE INVENTION

The processing of shrimp can be performed either manually or automatically. With manual operations, a worker must perform a number of operations to partially or entirely remove the shell from the meat of the shrimp, and cut the meat of the shrimp in a manner desirable to the end user. For example, the shell can be removed from the first, second, third, fourth, and fifth segments of the shell, leaving the sixth segment and fan tail of the shell attached to the exposed meat for tail-on processing. The exposed meat can then be cut, either deeply along its entire dorsal side for a tail-on butterfly variety, or shallowly along its entire dorsal side for tail-on round processing. Other varieties are possible.

While manual processing is effective, it is relatively time consuming and thus can lead to higher costs. Moreover, such prolonged contact between workers and the shrimp can lead to contamination of the shrimp. Additionally, the resulting processed product can be less than uniform depending upon the individual worker performing the operation, and the diligence with which the worker processes the shrimp.

Various automated processing machines have therefore been introduced and met with substantial commercial success. Examples of such machinery are disclosed in U.S. Pat. Nos. 3,159,871; 4,413,377; 4,414,709; 4,439,893; 4,472,858; 4,473,740; 4,507,825; 4,745,660; 4,769,871; 5,035,670; 5,366,405; 5,435,775; and 5,522,764; all of which are assigned to the present assignee.

While such automated machinery is effective, certain operations would benefit from further improvement to, among other things, reduce costs, improve throughput, and improve maintainability of the machinery.

SUMMARY OF THE INVENTION

In accordance with one aspect of the invention, a shrimp processing machine is provided which comprises a rotating wheel and a plurality of work stations positioned around a periphery of the rotating wheel. The plurality of work stations include a reciprocating meat picker assembly which includes a gear wheel operatively associated with the rotating wheel, a cam wheel attached to the gear wheel, a cam arm pivotally mounted proximate the cam wheel, a spring biasing the cam arm toward the cam wheel, and a plurality of meat picker tines extending from the cam arm.

In accordance with another aspect of the invention, a shrimp processing machine meat picker assembly is provided which comprises a plate, a first shaft rotatably mounted within the plate, a second shaft rotatably mounted within the plate, a cam wheel mounted to the first shaft, a cam arm mounted to the second shaft, a plurality of meat picker tines extending from the cam arm, and a gear wheel operatively associated with the cam wheel. Rotation of the gear wheel causes rotation of the cam wheel and pivoting of the cam arm and meat picker tines.

In accordance with another aspect of the invention, a shrimp processing machine is provided which comprises a drive wheel, a deveining brush, and a meat picking assembly. The drive wheel includes a plurality of clamping assemblies mounted on a periphery of the rotating wheel. The deveining brush is positioned proximate the main wheel and includes a circumferential surface. The circumferential surface of the deveining brush includes an apex from which first and second canted sides taper radially inward and laterally outward. The meat picking assembly is positioned proximate the main wheel and includes a cam wheel adapted to rotate while the drive wheel rotates. Rotation of the cam wheel causes the plurality of meat picker tines to reciprocatingly move relatively to the drive wheel.

In accordance with another aspect of the invention, a method of processing shrimp is provided which comprises the steps of securing shrimp to a periphery of a rotating drive wheel, cutting a shell of each shrimp, driving a cam wheel using the rotating drive wheel, and reciprocatingly moving meat picker tines using the rotating cam wheel. Reciprocation of the meat picker tines pulls shrimp meat from shells attached to the drive wheel.

These and other aspects and features of the invention will become more apparent from the following detailed description when taken in conjunction with the accompanying drawings.

While the invention is susceptible to various modifications and alternative constructions, certain illustrative embodiments thereof have been shown in drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Figure 1:
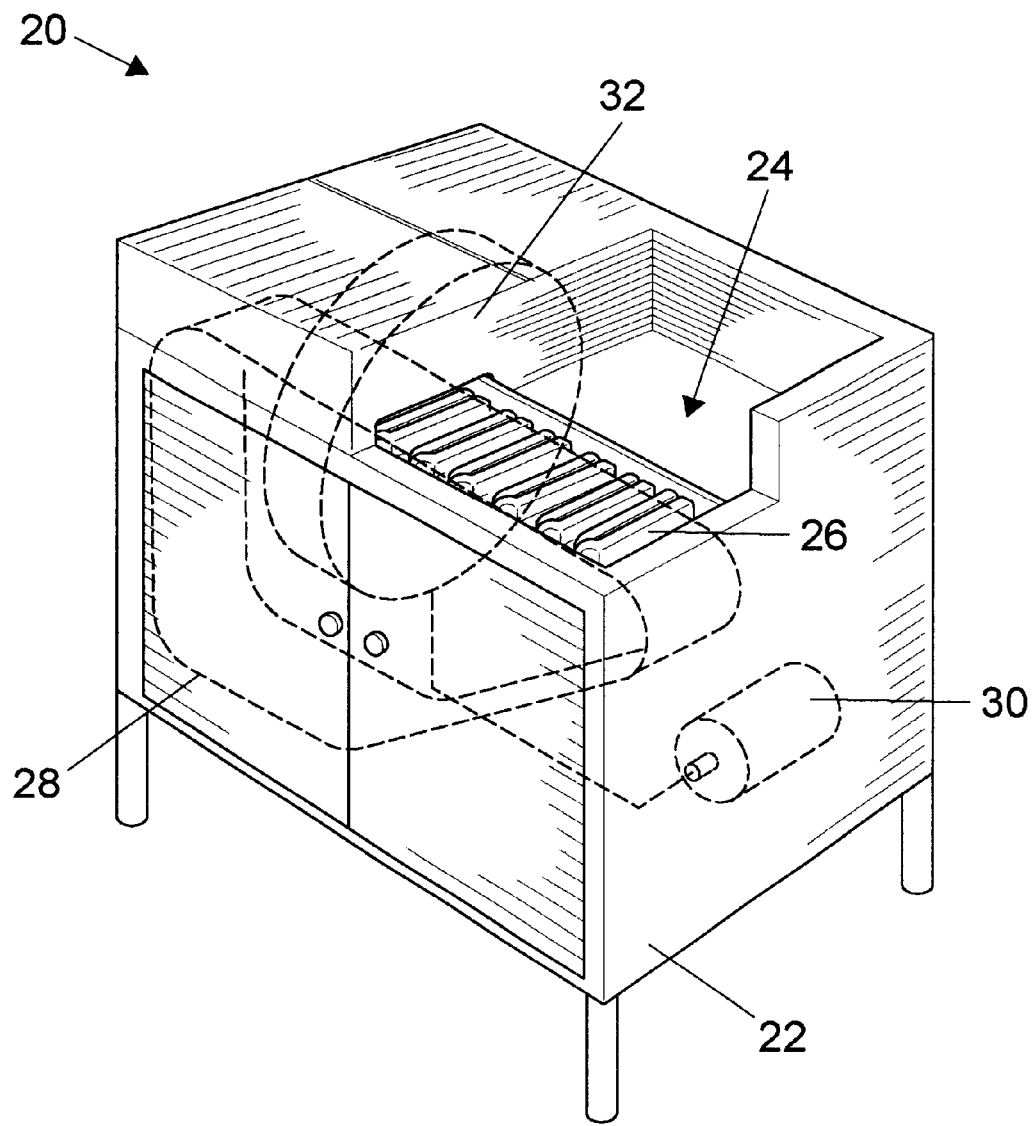
FIG. 1 is an isometric view of a shrimp processing machine constructed in accordance with the teachings of the invention.

Referring now to the drawings and with specific reference to FIG. 1, a shrimp processing machine constructed in accordance with the teachings of the invention is generally referred to by reference numeral 20. As shown therein, the machine 20 includes a housing 22 which includes a hopper 24 for receipt of shrimp (not shown). Shrimp are taken from the hopper 24 and manually placed within individual trays 26 of a continuous conveyor 28. The conveyor 28 is operatively connected to a motor 30. The motor 30 also causes a main drive gear or wheel 32 to rotate as will be described in further to detail herein.

Figure 2:
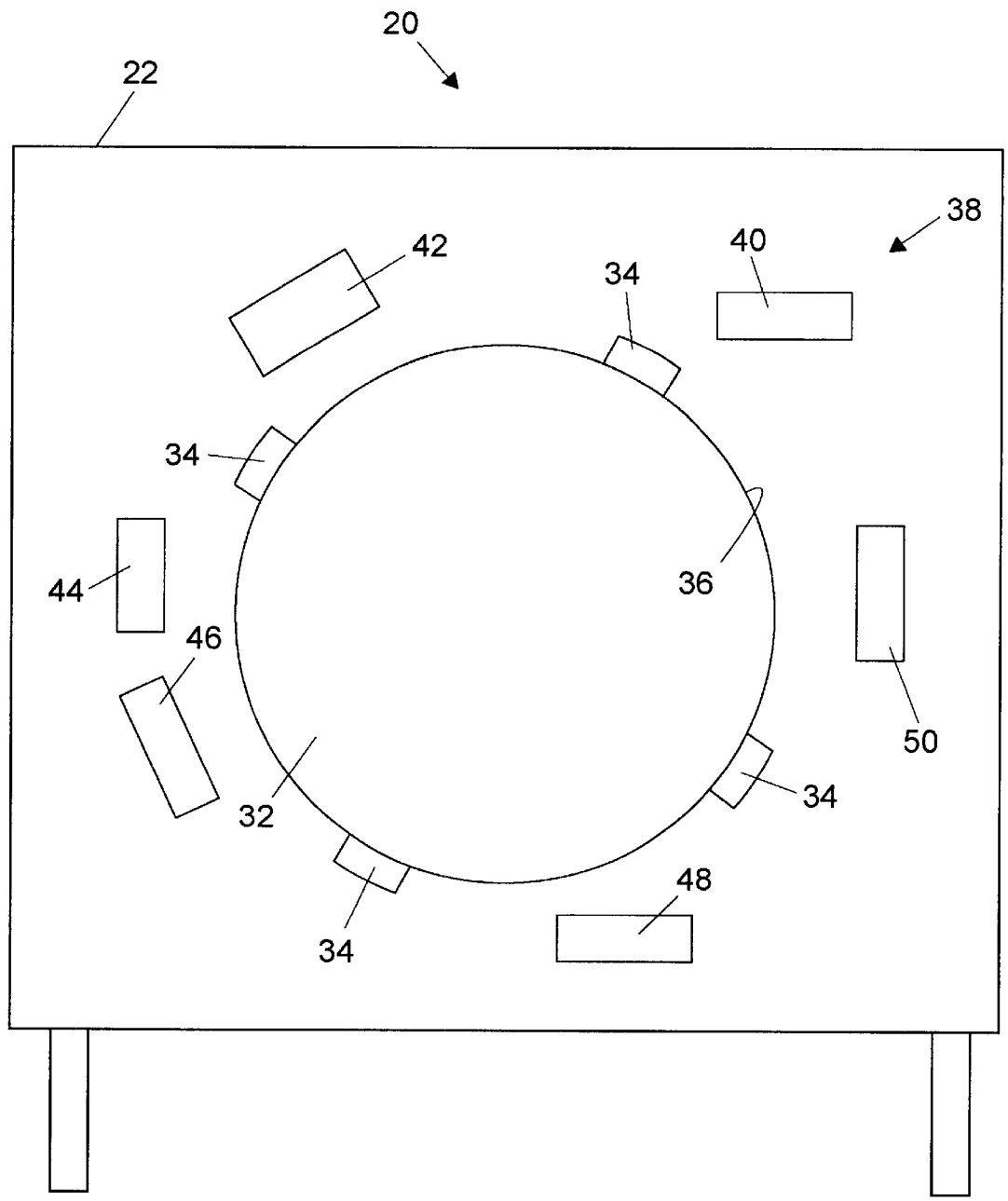
FIG. 2 is a schematic representation of a shrimp processing machine constructed in accordance with the teachings of the invention.

Referring now to FIG. 2, the drive wheel 32 is shown in schematic fashion having a plurality of clamping assemblies 34 positioned around a periphery 36 thereof. Each clamping assembly 34 is provided to receive an individual shrimp therein by gripping the shell, and allowing the meat to be pulled therefrom. Around the periphery 36 of the drive wheel 32 are positioned a number of operational stations 38 for performing individual functions upon each shrimp. Among the operational stations 38 which are possible are the clamping station 40, a shell breaking station 42, a cuffing station 44, a deveining station 46, a meat picking station 48, and a shell discarding station 50.

Figure 3:
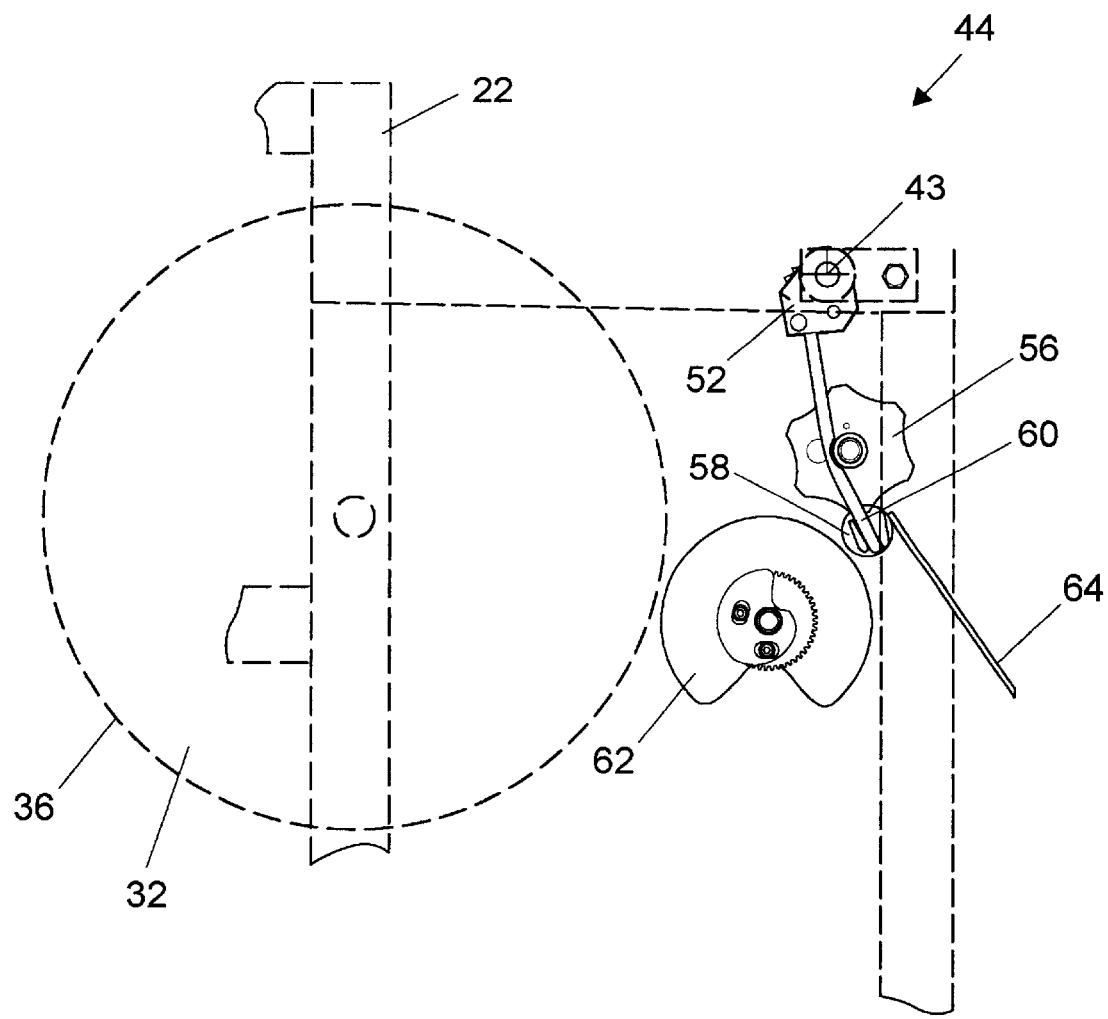
FIG. 3 is a side view of a cutting assembly constructed in accordance with the teachings of the invention.
Figure 4:
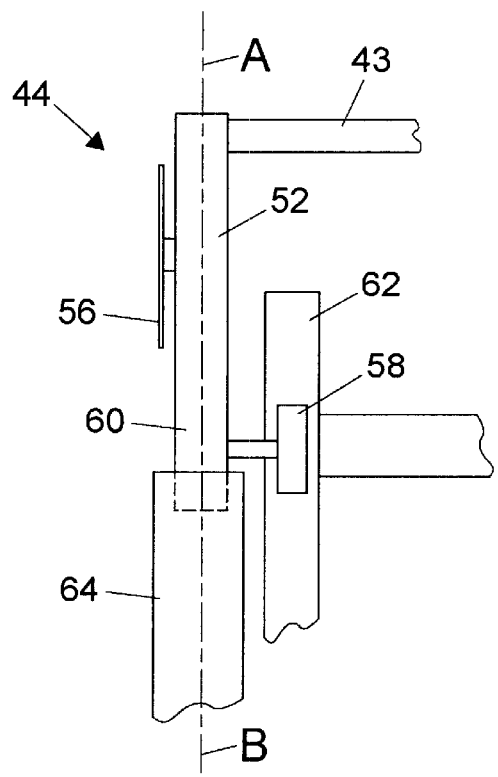
FIG. 4 is an end view of the cutting assembly of FIG. 3.

Referring now to FIGS. 3 and 4, the cutting station 44 is shown in detail. As shown therein, the cutting station 44 includes a pivotable cutter arm 52 mounted to the housing 22 at a pivot 54. A rotating blade 56 is mounted to the cutter arm 52, as is a roller 58. The roller 58 is provided at a distal end 60 of the cutter arm and is adapted to roll against a cam wheel 62. A leaf spring 64 biases the cutter arm 52 and roller 58 into engagement with the cam wheel 62. Upon rotation of the cam wheel 62, the roller 58 is caused to rotate as well, and the cutter arm 52 is caused to rotate about pivot 54 due to the eccentric shape of the cam wheel 62. In so doing, the blade 56 is caused to reciprocate relative to the periphery 36 of the drive wheel 32, and thereby create incisions into the shrimp provided in each clamping assembly 34.

As will be noted best from FIG. 4, the leaf spring 64 is aligned with the to cutter arm 52. More specifically, the cutter arm 52 and leaf spring 64 include longitudinal axes A and B, respectively. The longitudinal axes A and B are aligned such that the force created by the leaf spring 64 is imparted directly in line with the axis A of the cutter arm 52, thereby substantially eliminating any off-axis loading which may otherwise cause the pivot 54 to bind.

Figure 5:
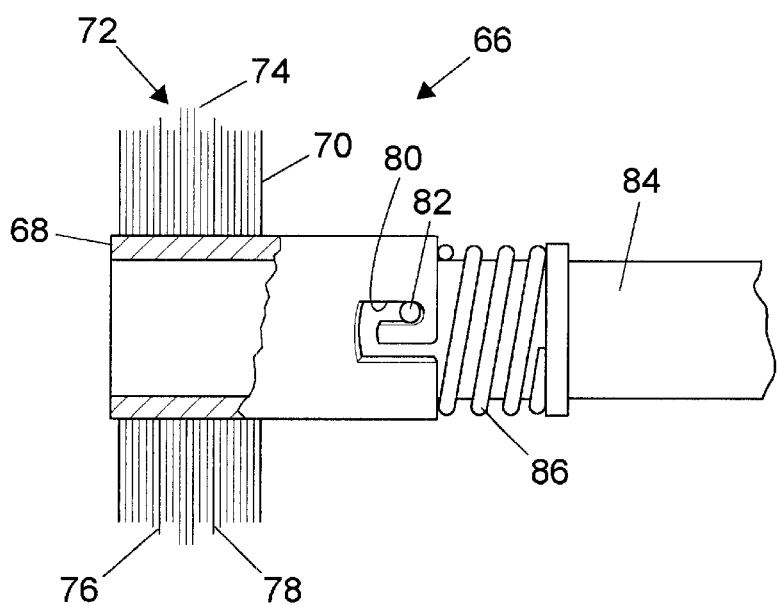
FIG. 5 is a side, partial cut-away, view of a deveining brush constructed in accordance with the teachings of the invention.
Figure 6:
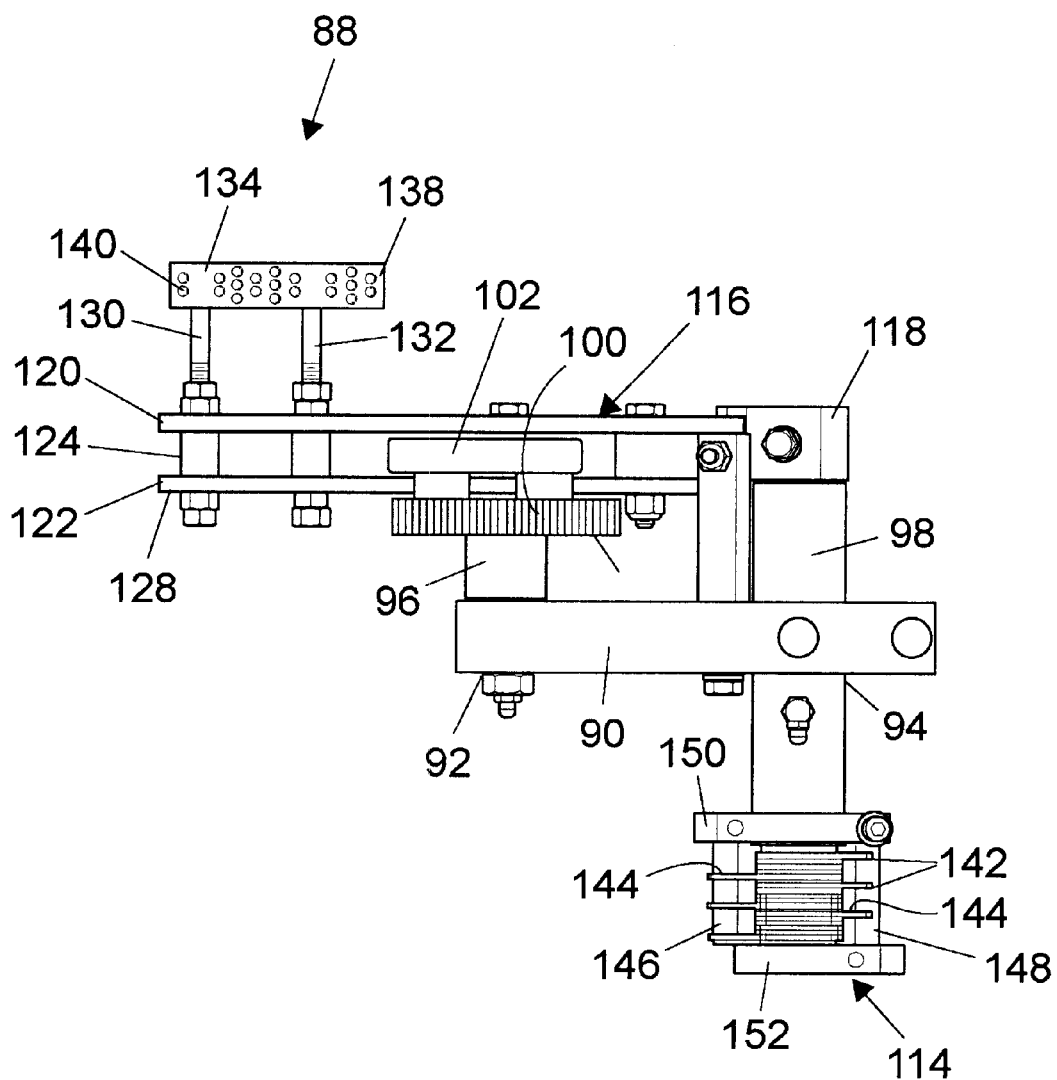
FIG. 6 is a plan view of a meat picking assembly constructed in accordance with the teachings of the invention.
Figure 7:
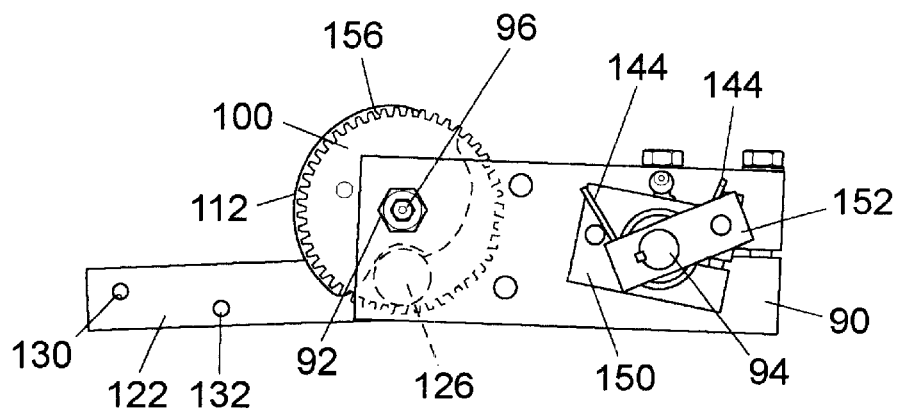
FIG. 7 is a side view of the meat picking assembly of FIG. 6.
Figure 8:
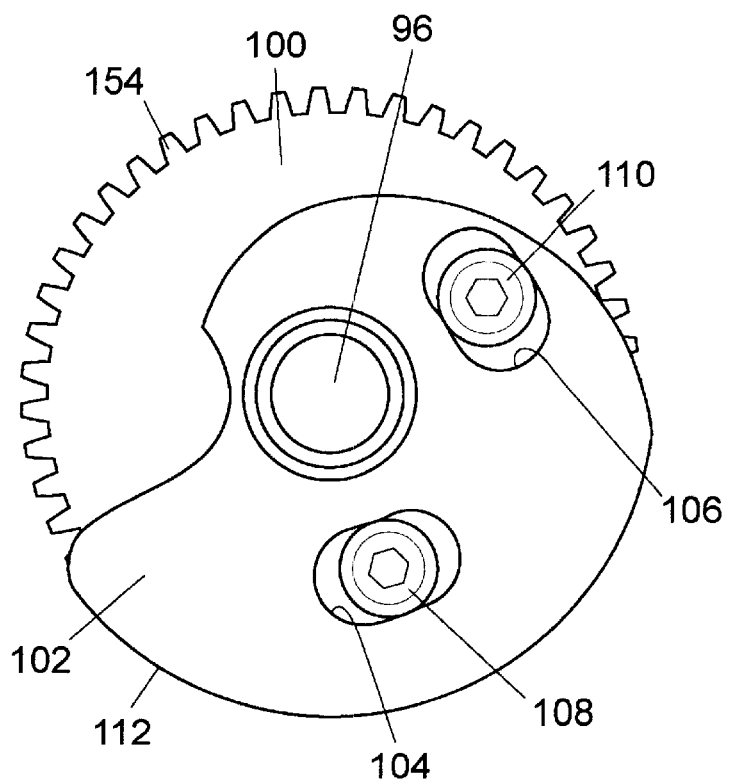
FIG. 8 is a side view of a meat picking assembly cam and gear wheel constructed in accordance with the teachings of the invention.

Referring now to FIG. 5, a deveining brush 66 is shown in detail. After the blade 56 causes an incision to be made within the shrimp, the deveining brush 66 is provided to ensure that the vein, provided along the dorsal side of the shrimp, is removed. The brush 66 is provided with a central ring or mandrel 68 from which a plurality of bristles 70 radially extend. The bristles 70, upon rotation, cause an abrasive action when in engagement with the shrimp which ensures that the vein is removed from the shrimp. As shown in FIG. 5, the bristles 70 are shaped to form a circumferential surface 72 having an apex 74 from which first and second canted sides 76, 78 radially extend inwardly, and laterally extend outwardly. The apex 74 therefore provides the surface entering the shrimp to the deepest degree.

As shown in FIG. 5, the central mandrel 68 includes a mounting groove 80 adapted to cooperate with a pin 82 extending from a shaft 84. A spring 86 is mounted about the shaft 84 to bias the mandrel 68 outwardly and causing the central mandrel 68 to engage the pin 82, locking the deveining brush 66 to the shaft 84 until the spring 86 is compressed. The spring 86 may be easily compressed by an operator when the brush 86 needs to changed or removed.

Referring now to FIGS. 6–9, a meat picking assembly 88 is shown in to detail. A meat picking assembly 88 includes a mounting block 90 secured to the housing 22 of the machine 20. The block 90 includes first and second bearing apertures 92 and 94 which support first and second shafts 96 and 98. A gear wheel 100 is mounted to the first shaft 96, with a cam wheel 102 being mounted to the gear wheel 100. As shown best in FIG. 8, the cam wheel 102 includes first and second slots 104, 106 which receive first and second fasteners 108, 110 for securing the cam wheel 102 to the gear wheel 100. The slots 104, 106 enable the cam wheel 102 to be repositioned relative to the gear wheel 100 to fine tune the timing with which the meat picking assembly 88 reciprocates towards the drive wheel 32. The cam wheel 102, in the preferred embodiment, is a substantially kidney shaped in plan view having an outer periphery 112.

Figure 9:
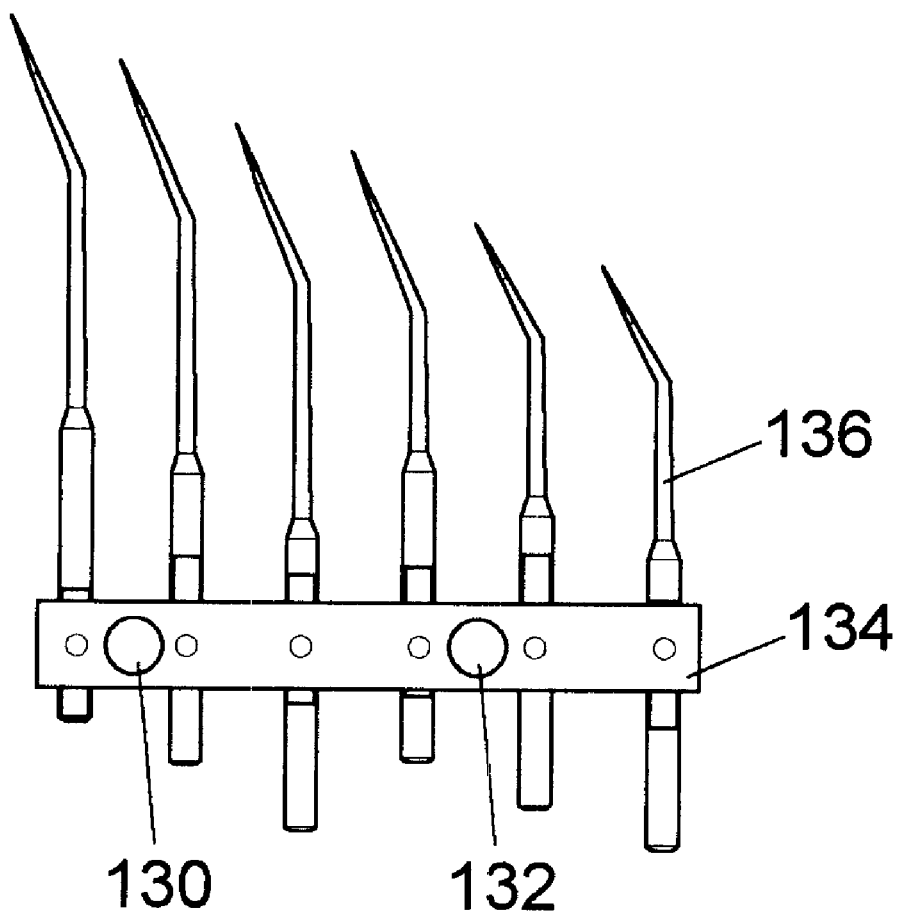
FIG. 9 is a side view of a meat picker tine platform constructed in accordance with the teachings of the invention.

Mounted to the second shaft 98 are a spring assembly 114 and a cam arm 116. The cam arm 116 includes a mounting arm 118 from which first and second side legs 120, 122 extend. Side legs 120, 122 extend at a spaced distance creating a gap 124 into which the cam wheel 102 is adapted to extend as will be described in further detail herein. Spanning the gap 124 is a cam roller 126, as shown best in FIG. 7. At distal ends 128 of the side legs 120, 122 are first and second bolts 130, 132, which support a meat picker tine platform 134. A plurality of meat picker tines 136 extend from the platform 134, as shown in FIG. 9, creating an angled tip profile facilitating the meat picking process. As shown in FIG. 9, the platform 134 includes a first row of apertures 138, as well as a second roll of apertures 140 parallel to the first row 138. The rows of apertures 138 and 140 are adapted to support tines 136 so as to create first and second rows of parallel tines 136.

Referring again to FIGS. 7 and 8, the spring assembly 114 is shown attached to the second shaft 98 at an end opposite of the cam arm 116. The spring assembly 114 includes a plurality of springs 142 which, in the preferred embodiment, are provided in the form of helical or torsion springs. The springs 142 include legs 144 which engage rods 146, 148 extending from plates 150, 152. The springs 142 serve to limit the degree of rotation of the second shaft 98 which in turn limits the degree of rotation of the cam arm 116. In preferred embodiment, the cam arm 116 is able to move across an arc of approximately 15 to 20 degrees.

In operation, it can be seen that the gear wheel 100, which includes a plurality of teeth 154, meshes with gear teeth (not shown) of the drive wheel 32. In so doing, when the drive wheel 32 rotates at the direction of motor 30, the gear wheel 100 is caused to rotate as well. Rotation of the gear wheel 100 causes the cam wheel 102, which is attached to the gear wheel 100 to rotate. Rotation of the cam wheel 102 causes its outer periphery 112 to engage the cam roller 126. Depending upon the position to which the cam wheel 102 is rotated, the cam arm 116 will be caused to pivot about second shaft 98, toward or away from the drive wheel 32. More specifically, if a relatively large radiused section a of the cam wheel 102 is caused to be engaged with the cam roller 126, the cam arm 116 will be caused to pivot downwardly and away from the drive wheel 32. Conversely, when a relatively small radiused section P of the cam wheel 102 is in engagement with the cam roller 126, the spring assembly 114 will cause the cam arm 116 to pivot in an opposite direction back toward the drive wheel 32. In so doing, the tines 136 extending from the platform 134 will be caused to approach the drive wheel 32 which in turn will cause the tines 136 to penetrate the shrimp provided therein. Upon further rotation of the drive wheel 32, the shell to be retained within the clamping assemblies 34 and the meat will remain impaled upon the tines 136. Continued rotation of the cam wheel 102 will necessarily cause the tines 136 to make a repeating reciprocating motion relative to the drive wheel 32.

From the foregoing, it will be appreciated by one of the ordinary skill in the art that the teachings of the invention can be used to process shrimp in a cost effective, efficient, consistent, and repeatable manner.

What is claimed is:

1. A shrimp processing machine, comprising:

a rotating wheel; and a plurality of work stations positioned around a periphery of the rotating wheel, the plurality of work stations including a reciprocating meat picker assembly, the meat picker assembly including a gear wheel operatively associated with the rotating wheel, a cam wheel attached to the gear wheel, a cam arm pivotally mounted proximate the cam wheel, a spring biasing the cam arm toward the cam wheel, and a plurality of meat picker tines extending from the cam arm.

2. The shrimp processing machine of claim 1, wherein the rotating wheel and gearwheel includes teeth in mating engagement.

3. The shrimp processing machine of claim 1, further including a plate secured to the machine, the gear wheel being mounted on a first shaft journalled in the plate, the cam arm being mounted on a second shaft journalled in the plate.

4. The shrimp processing machine of claim 3, wherein the cam arm includes sides between which a cam surface extends.

5. The shrimp processing machine of claim 3 wherein the spring is torsion spring mounted to the second shaft, the torsion spring including first and second ends engaging stops limiting rotation of the second shaft.

6. The shrimp processing machine of claim 1, wherein the cam wheel is adjustably mounted to the gear wheel.

7. A shrimp processing machine meat picker assembly, comprising:

a plate;

a first shaft rotatably mounted within the plate;

a second shaft rotatably mounted within the plate;

a cam wheel mounted to the first shaft;

a cam arm mounted to the second shaft;

a plurality of meat picker tines extending from the cam arm; and a gear wheel operatively associated with the cam wheel, rotation of the gear wheel causing rotation of the cam wheel and pivoting of the cam arm and meat picker tines.

8. The shrimp processing machine meat picker assembly of claim 7, further including a torsion spring mounted around the second shaft, the torsion spring being in engagement with pins extending from the plate.

9. The shrimp processing machine meat picker assembly of claim 7, wherein the cam wheel is adjustably mounted to the gear wheel.

10. The shrimp processing machine meat picker assembly of claim 7, wherein a meat picker plate laterally extends from the cam arm and wherein the plurality of picker tine s extend from the meat picker plate.

11. The shrimp processing machine meat picker assembly of claim 10, wherein the meat picker plate includes first and second rows of mounting apertures, and wherein first and second rows of meat picker tines extend from the first and second rows of mounting apertures.

12. A shrimp processing machine, comprising:

a drive wheel having a plurality of clamping assemblies mounted on a periphery of the rotating wheel;

a deveining brush positioned proximate the main wheel, the deveining brush having a circumferential surface, the circumferential surface having an apex from which first and second canted sides taper radially inward and laterally outward; and a meat picking assembly positioned proximate the main wheel, the meat picking assembly including a cam wheel adapted to rotate when the drive wheel rotates, rotation of the cam wheel causing a plurality of meat picker tines to reciprocatingly move relative to the drive wheel.

13. The shrimp processing machine of claim 12, wherein the deveining brush includes a plurality of bristles extending from a shaft, the bristles being cut to lengths sufficient to establish a u-shaped cross-sectional configuration.

14. The shrimp processing machine of claim 12, wherein the cam wheel of the meat picking assembly is mounted to a gear wheel meshed with the drive wheel.

15. The shrimp processing machine of claim 12, wherein the meat picking assembly includes an arm having first and second parallel sides with a cam roller extending therebetween.

16. The shrimp processing machine of claim 15, wherein the arm includes first and second ends, the arm being mounted at the first end to a pivot shaft, the plurality of tines extending from the second end.

17. The shrimp processing machine of claim 16, further including a spring mounted about the pivot shaft, the spring biasing the arm into engagement with the cam wheel.

18. The shrimp processing machine of claim 12, wherein the deveining brush is removably mounted to a shaft, the brush including a central ring having a locking groove, a spring on the shaft biasing the locking groove into engagement with the shaft.

19. The shrimp processing machine of claim 12, further including a cutting assembly mounted proximate the drive wheel, the cutting assembly including a pivotable cutter arm to which a blade is rotatably attached, the cutter arm including a roller at a distal end, the roller being biased into engagement with a cam wheel by a leaf spring.

20. The shrimp processing machine of claim 19, wherein the leaf spring includes a longitudinal axis and the cutter arm includes a longitudinal axis, the longitudinal axes of the leaf spring and cutter arm being aligned.

21. A method of processing shrimp, comprising the steps of:

securing shrimp to a periphery of a rotating drive wheel;

cutting a shell of each shrimp;

driving a cam wheel by meshing gear teeth extending from the cam wheel with gear teeth extending from the drive wheel; and reciprocatingly moving meat picker tines using the rotating cam wheel, reciprocation of the meat picker tines pulling shrimp meat from shells attached to the drive wheel.

22. The method of claim 21, wherein the reciprocatingly moving step is performed by pivotally mounting a cam arm from which the meat picker tines extend, and biasing the cam arm against the cam wheel.

23. The method of claim 21, wherein the biasing step is performed using a spring.

* * * * *

UNITED STATES PATENT AND TRADEMARK OFFICE
CERTIFICATE OF CORRECTION

PATENT NO.    : 6,485,363 B2
DATED         : November 26, 2002
INVENTOR(S)   : Jon T. Keith It is certified that error appears in the above-identified patent and that said Letters Patent is hereby corrected as shown below:

<u>Title page,</u>
Item [57], ABSTRACT,
Line 2, please replace "described" with -- disclosed --.

<u>Column 5,</u>
Line 18, please replace "gearwheel" with -- gear wheel --.

Signed and Sealed this

Second Day of September, 2003

JAMES E. ROGAN
*Director of the United States Patent and Trademark Office*